No. 846,341. PATENTED MAR. 5, 1907.
F. OGDEN.
BEARING FOR ROTARY SHAFTS.
APPLICATION FILED AUG. 8, 1906.
2 SHEETS—SHEET 1.
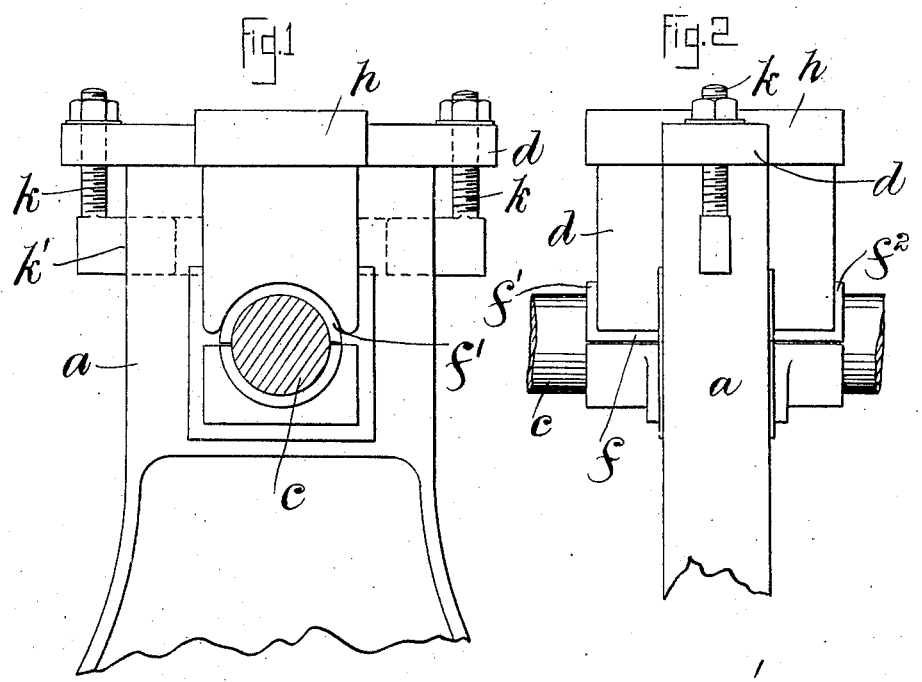
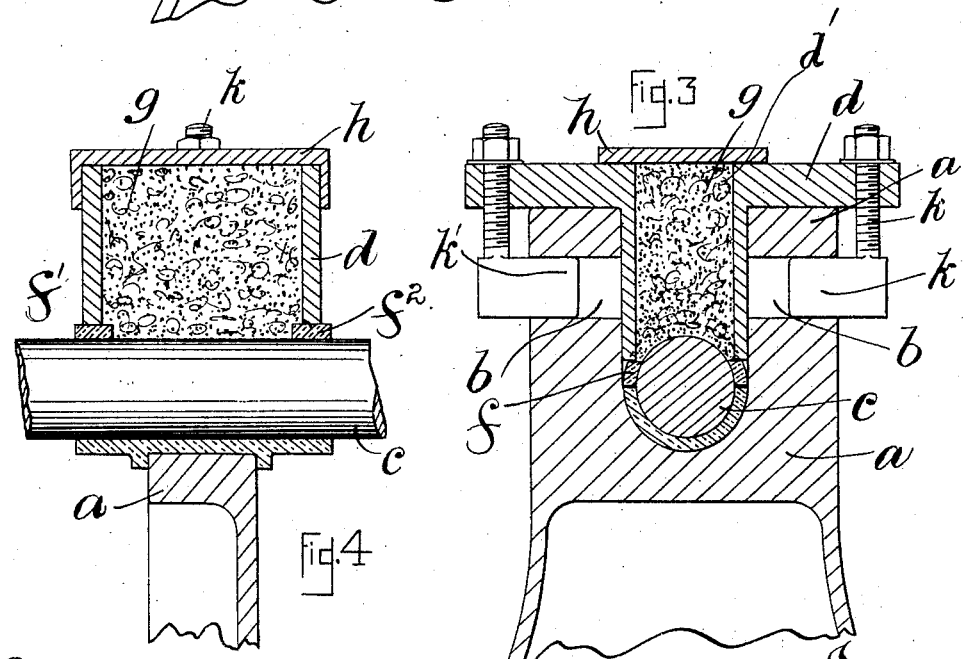

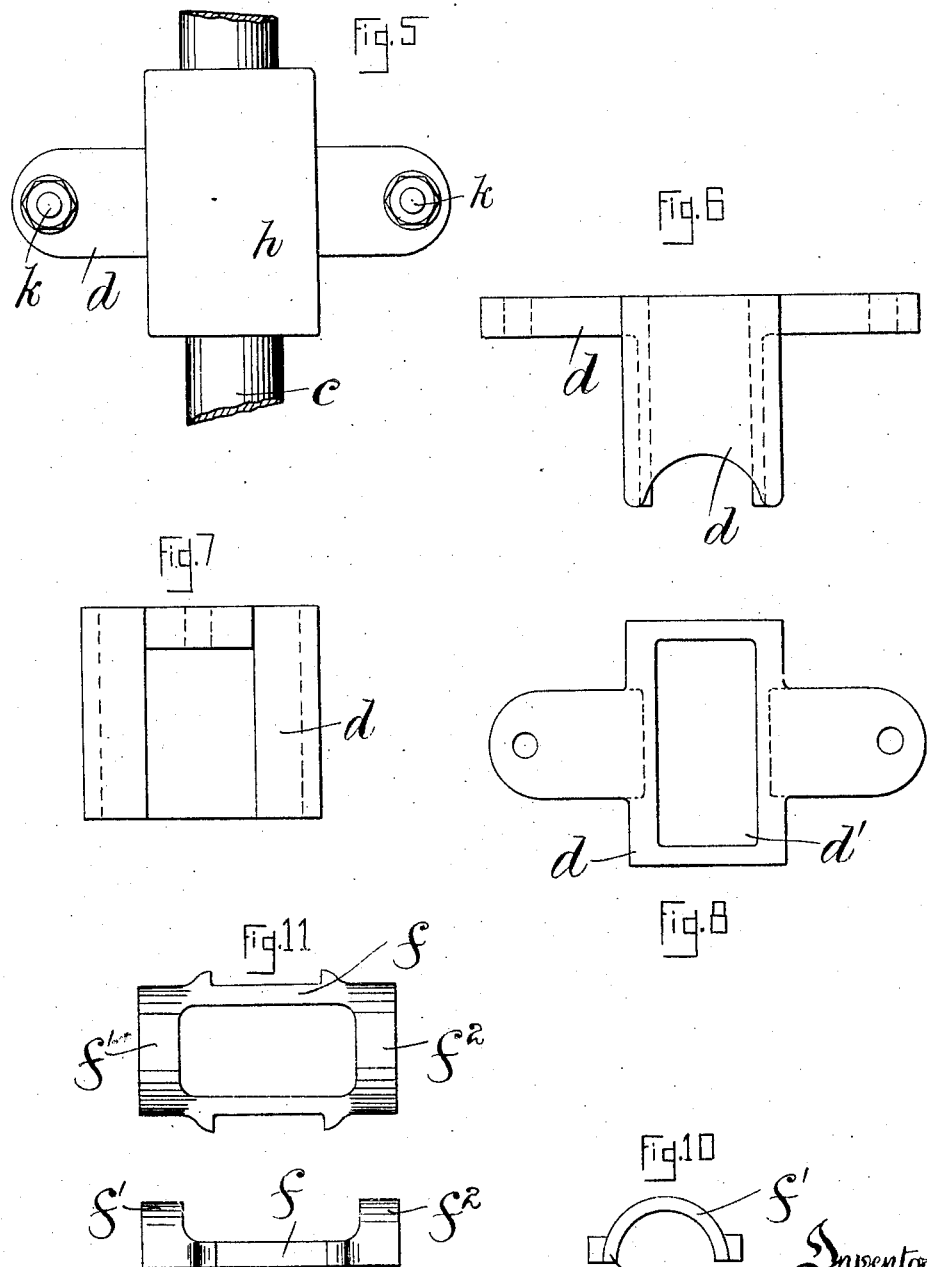

UNITED STATES PATENT OFFICE.

FREDERICK OGDEN, OF KEIGHLEY, ENGLAND.

BEARING FOR ROTARY SHAFTS.

No. 846,341. Specification of Letters Patent. Patented March 5, 1907.

Application filed August 8, 1906. Serial No. 329,664.

*To all whom it may concern:*

Be it known that I, FREDERICK OGDEN, a subject of the King of Great Britain, and a resident of 1 Castle road, Keighley, in the county of York, England, have invented a certain new and useful Improvement in Bearings for Rotary Shafts, of which the following description, together with the accompanying sheets of drawings, is a specification.

This invention relates to bearings for the rotary shafts of machines known as "cotton-gins," wherein the shafts revolve at a comparatively high rate of speed; and my said invention consists in constructing the caps and parts in connection therewith used as portions of said bearings; whereby said rotary shafts may be better lubricated than heretofore, while the fixing in position of such caps and parts in connection with one of the shafts therein does not require any alteration in the formation of the bearings which support said shafts.

In the accompanying sheets of drawings, which are illustrative of my said invention, Figures 1 and 2 are side and end elevations, respectively, of my improved parts shown as applied to the bearing for one of the principal shafts of a cotton-gin. Figs. 3 and 4 are side sectional and section end elevations, respectively, of my said improved parts. Fig. 5 is a view thereof as seen from above. Figs. 6, 7, and 8 are side elevation, end elevation, and plan, respectively, of the cap or holder hereinafter described. Figs. 9, 10, and 11 are side, end, and top views, respectively, of the skeleton bush hereinafter referred to.

As is well known, in connection with the bearings $a$ used in the machine above referred to a cotter is inserted through an opening $b$ in the usual way to keep the cap as heretofore constructed in position, such cap being made to allow oil or semiliquid lubricant to pass down through it onto the shaft $c$. On account of this class of machine being used in countries where the atmosphere is very warm, it is found that the lubricant as heretofore employed flows away and leaves the shaft $c$ dry and otherwise unprepared for revolving smoothly. To avoid this, I construct the cap $d$ so that it may have an opening or cavity $d'$ for the reception of a plastic lubricant, and I make this cap $d$ of such a shape that it will hold the skeleton bush $f$ in contact with the rotary shaft $c$, and the formation of this bush $f$ is such as will enable the plastic lubricant $g$ to fall into contact with the shaft $c$, while its outer ends $f'$ $f^2$ are strong enough to act as a bearing for the shaft in a vertical direction. Over this hollow cap $d$ I arrange a cover $h$ to fit loosely, so that it may be readily detached to allow the lubricant to be easily supplied to the cavity $d'$.

To maintain the cap $d$ in position, I make use of the bolts $k$, the heads $k'$ of which are at right angles to the body part, so that they will take into the openings $b$ in the bearing $a$. Thus when the nuts are screwed on these bolts $k$ they firmly hold the cap $d$ in position, and said cap $d$ prevents said bolts from leaving their positions in the openings $b$.

By thus making the cap $d$, the bush $f$, and the bolts $k$ of the shape described and illustrated a considerable portion of the shaft $c$ within the bearing $a$ is left clear for the lubricant to contact with, while all the parts may be readily fixed in position.

Such being the nature and object of my said invention, what I claim is—

1. In bearings for rotary shafts of cotton-gins, a cap formed to fit in said bearings and having a cavity to receive a plastic lubricant, a skeleton bush removably fitting within the bearings below the cap, and means for securing said parts in position.

2. In bearings for rotary shafts of cotton-gins a cap formed to fit in said bearings and having a cavity to receive a plastic lubricant, a skeleton bush to fit within the bearings and said cap and bolts having lateral projections or wings to take into openings in said bearings in order to secure the cap and bush in position.

3. In bearings for rotary shafts of cotton-gins a cap formed to fit in said bearings and having a cavity to receive a plastic lubricant, a skeleton bush removably fitting within the bearings below said cap, means for securing said cap and bush in position and a cover for protecting same.

In testimony whereof I have affixed my signature in presence of two witnesses.

FREDERICK OGDEN.

Witnesses:
 FRANK WOOD,
 MILFORD HEY.